US009533405B2

(12) United States Patent
Chern

(10) Patent No.: US 9,533,405 B2
(45) Date of Patent: Jan. 3, 2017

(54) C-CLIP TOOL

(71) Applicant: Shwu-Ruu Chern, Taichung (TW)

(72) Inventor: Shwu-Ruu Chern, Taichung (TW)

( * ) Notice: Subject to any disclaimer, the term of this patent is extended or adjusted under 35 U.S.C. 154(b) by 165 days.

(21) Appl. No.: 14/474,255

(22) Filed: Sep. 1, 2014

(65) Prior Publication Data

US 2016/0059397 A1 Mar. 3, 2016

(51) Int. Cl.
*B23P 19/04* (2006.01)
*B25B 27/20* (2006.01)

(52) U.S. Cl.
CPC .................................. *B25B 27/205* (2013.01)

(58) Field of Classification Search
USPC ............................. 29/225; 81/300, 302, 307
See application file for complete search history.

(56) References Cited

U.S. PATENT DOCUMENTS 6,983,677 B1 * 1/2006 Engel .................... B25B 27/205 29/229
2014/0202291 A1 * 7/2014 Zeng .................... B25B 27/205 81/302

* cited by examiner

*Primary Examiner* — Joseph J Hail
*Assistant Examiner* — Shantese McDonald
(74) *Attorney, Agent, or Firm* — Pro-Techtor International Services; Ian Oglesby

(57) ABSTRACT

A C-clip tool includes a first part and a second part. A first arm and a second arm are connected between the first and second parts. The second part has a reception hole and a rod is located at the mediate portion of the reception hole. Two enlarged holes are located on two ends of the reception hole and communicate with the reception hole. A resilient plate is located in the reception hole and two pillars are connected to the resilient plate. A push member has a block which optionally contacts one of the two pillars. Two operation members are respectively connected to the first and second arms. The operation members are replaceable to operate on different sizes of C-clips.

8 Claims, 8 Drawing Sheets

C-CLIP TOOL

BACKGROUND OF THE INVENTION

1. Fields of the Invention

The present invention relates to a C-clip tool, and more particularly, to a C-clip tool that is easily used to secure and loosen different types of C-clips.

2. Descriptions of Related Art

The conventional C-clip is widely used on shafts and holes so as to position parts. The C-clips provide sufficient force to secure the parts so that when installing or removing a C-clip, a C-clip tool is used. When a C-clip is to be mounted to a shaft, the specific type of C-clip tool is used to expand the two ends of the C-clip and then the expanded C-clip is mounted to the shaft. When a C-clip is to be engaged with a hole, the two ends of the C-clip has to be pushed toward each other, and the narrowed C-clip is then engaged with the hole.

It is noted that the C-clip tool for installing the C-clip to the shaft is different from the C-clip tool for engaging the C-clip with the hole. In other words, the user has to prepare the two different types of C-clip tools with him/her and the tools are heavy.

TW200047 discloses an improved C-clip tool which has multiple holes in the handle, and each of the plier heads has a positioning pin on each of the two opposite sides thereof. The positioning pines are inserted into the holes in the handles and the plier heads are positioned by pushing a button. When in use, the positioning pines are inserted into the holes, and the push button and the switch plate extend through the plier heads and the body. The push button is then pushed to let the spring contact the outside of the plier heads, the switch plate is then switched to be perpendicular to the push button. An insertion pin is inserted into the positioning hole on the inside of the handle, the C-clip is then able to be snapped to an object. The plier heads can be replaced.

Although the improved C-clip tool partially eliminates the shortcomings of the conventional C-clip tools, the user still has to prepare different shapes and sizes of the plier heads.

The present invention intends to provide a C-clip tool which eliminates the shortcomings mentioned above.

SUMMARY OF THE INVENTION

The present invention relates to a C-clip tool and comprises a first part having a first handle on the first end thereof, and a first through hole and a slot are defined through the second end of the first part. A second part has a second handle on the first end thereof, and a second through hole and a reception hole are defined through the second end of the second part. The second hole is located corresponding to the first through hole. The reception hole is located corresponding to the slot. A rod is located at the mediate portion of the reception hole. A first enlarged hole and a second enlarged hole are located on two ends of the reception hole and communicate with the reception hole.

A switch unit comprises a resilient plate, a first pillar, a second pillar and a push member. The resilient plate is accommodated in the reception hole of the second part. The first and second pillars are connected to the resilient plate and respectively located in the first and second enlarged holes. The push member has a block extending from one side thereof and the block extends through the slot of the first part and contacts the first pillar or the second pillar.

A first arm has a first positioning hole and a first passage. The first pillar is inserted in the first positioning hole. Two first curved flanges respectively extend from two sides of the first arm and are received in the first and second through holes when the first arm is connected to the first and second parts. A second arm has a second positioning hole and a second passage. The second pillar is inserted in the second positioning hole. Two second curved flanges respectively extend from two sides of the second arm and are received in the first and second through holes when the second arm is connected to the first and second parts.

An axle extends through the first and second through holes of the first and second parts. Two operation units are respectively connected to the first and second arms. Each operation unit has a knob, a movable member having a path, and an operation member having a tip on each of two ends thereof. The two movable members respectively extend through the first and second passages. The two knobs are respectively connected to the two movable rods. The two operation members respectively extend through the paths of the movable members.

Preferably, the resilient plate is a wave-shaped plate and has a recessed area defined in the mediate portion of one side thereof. The rod in the reception hole is engaged with the recessed area. Two protrusions are formed on two ends of the other side of the resilient plate. The two protrusions are respectively engaged with the first and second enlarged holes.

Preferably, the push member has an anti-slip surface.

Preferably, the block of the push member extends through the slot of the first part and a pin extends through the block so that the block is not disengaged from the slot.

Preferably, the first and second handles each have a recess defined in an inside thereof. A resilient member is connected between the first and second handles. Two ends of the resilient member are engaged with the two recesses respectively.

Preferably, the resilient member is a spring.

Preferably, a ratchet unit is provided to the C-clip tool and comprises a rack, a resilient member, a release bar having a head, and a bolt. The rack is fixed to the first part and has a toothed face. The bolt extends through the head of the release bar and the resilient member of the ratchet unit and is connected to the second part. Two ends of the resilient member of the ratchet unit are hooked to the second part and the head of the release bar. Multiple ratchet teeth are formed on the outside of the head and engaged with the toothed face of the rack.

Preferably, the resilient member of the ratchet unit is a torsion spring.

The primary object of the present invention is to provide a C-clip tool which provides two different functions of expanding the C-clip and narrowing the C-clip.

Another object of the present invention is to provide a C-clip tool wherein the operation members can be replaceable according practical needs.

Yet another object of the present invention is to provide a C-clip tool wherein the angle of the operation members can be adjustable.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
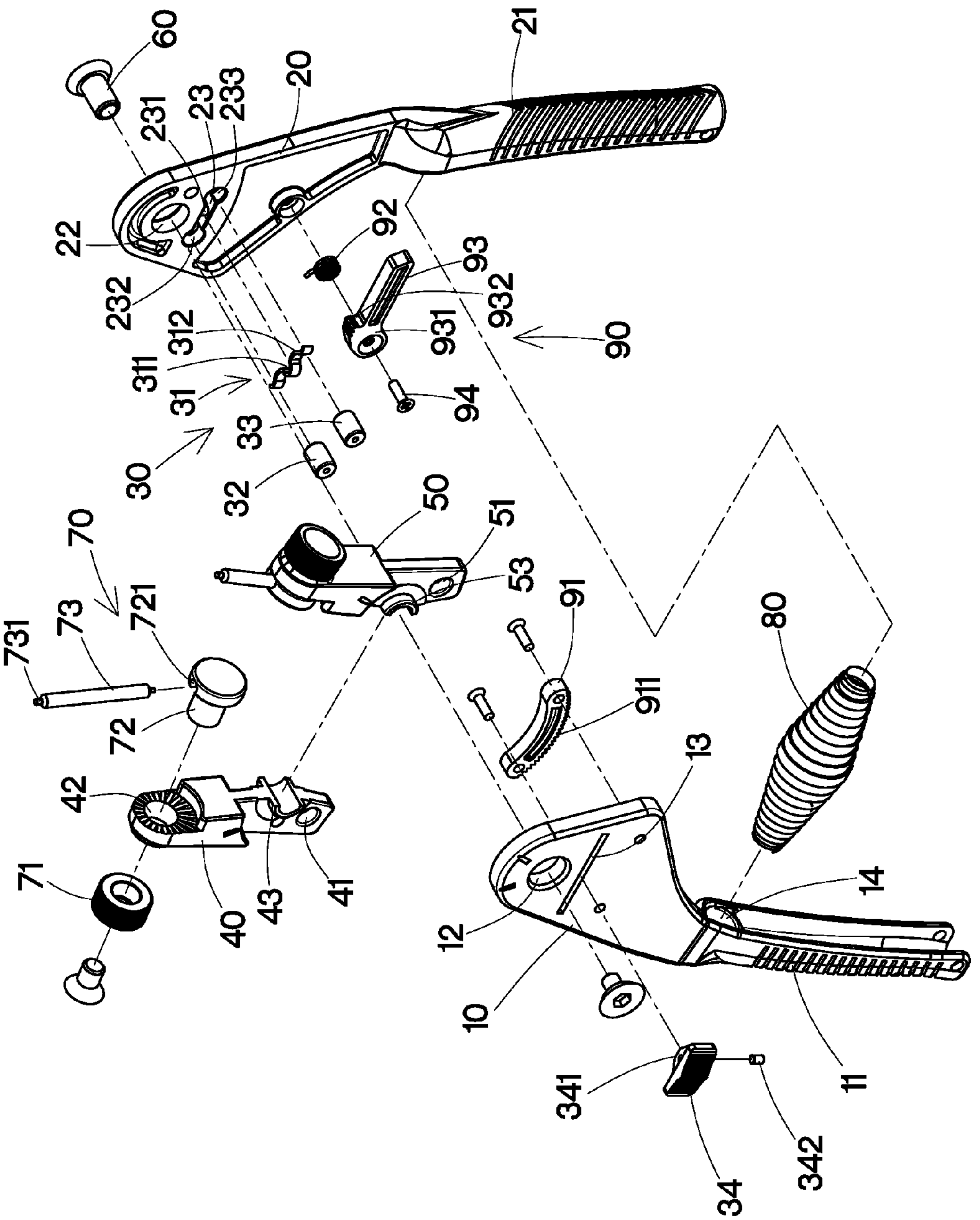
FIG. 1 is an exploded view of the C-clip tool of the present invention.
Figure 2:
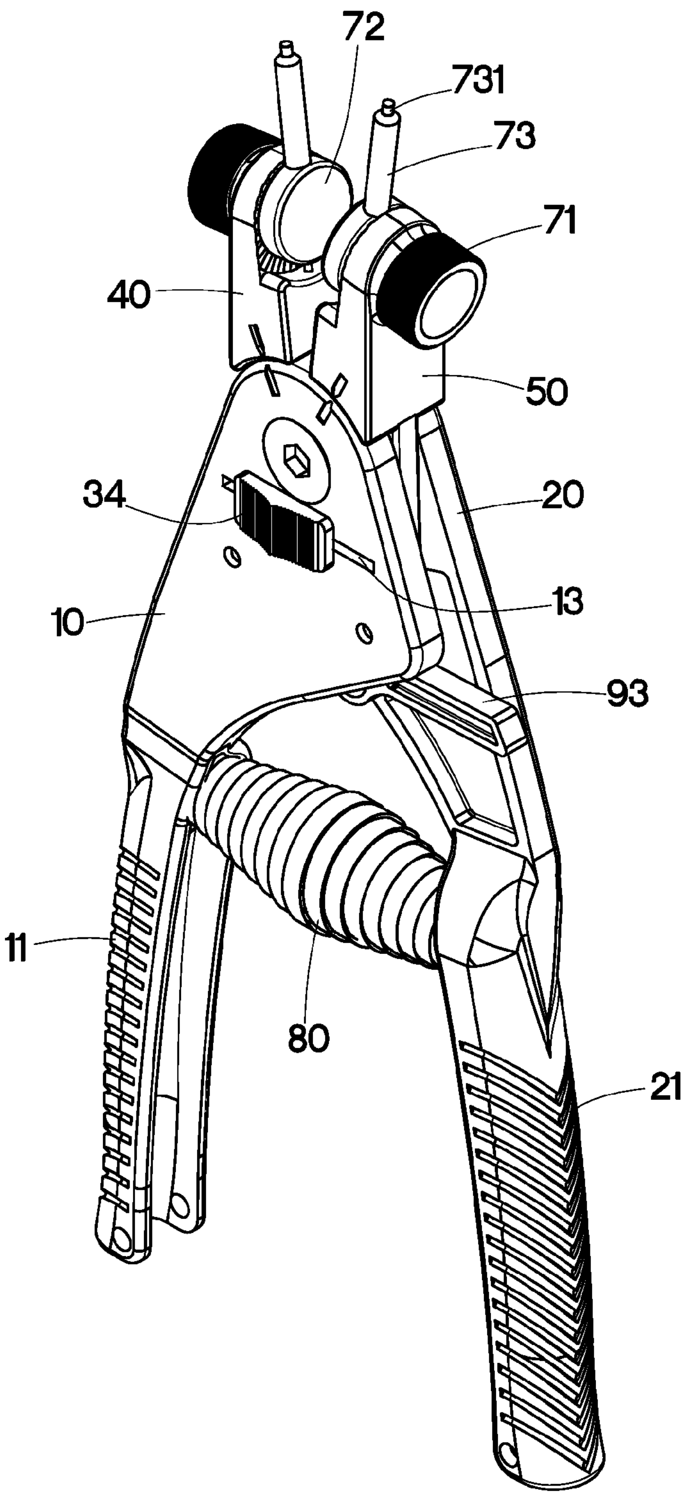
FIG. 2 is a perspective view to show the C-clip tool of the present invention.
Figure 3:
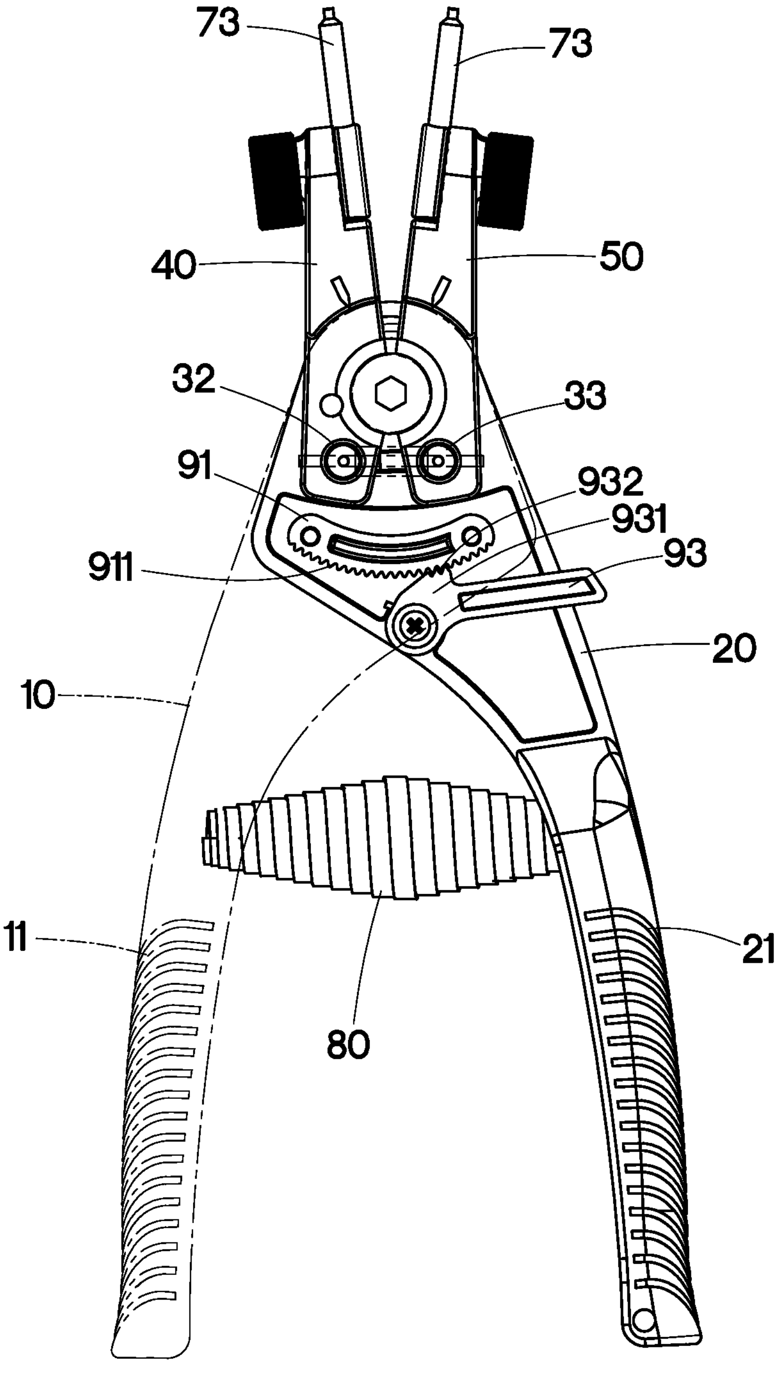
FIG. 3 is a front view of the C-clip tool of the present invention.

Referring to FIGS. 1 to 8, the C-clip tool of the present invention comprises a first part 10 having a first handle 11 on the first end thereof. A first through hole 12 and a slot 13 are defined through the second end of the first part 10. A second part 20 has a second handle 21 on the first end thereof. A second through hole 22 and a reception hole 23 are defined through the second end of the second part 20. The second hole 22 is located corresponding to the first through hole 12. The reception hole 23 is located corresponding to the slot. A rod 231 is located at the mediate portion of the reception hole 23. A first enlarged hole 232 and a second enlarged hole 233 are located on two ends of the reception hole 23 and communicate with the reception hole 23.

The first and second handles 11, 21 each have a recess 14 defined in an inside thereof. A resilient member 80 such as a spring, is connected between the first and second handles 11, 21. The two ends of the resilient member 80 are engaged with the two recesses 14 respectively.

A switch unit 30 comprises a resilient plate 31, a first pillar 32, a second pillar 33 and a push member 34. The resilient plate 31 is accommodated in the reception hole 23 of the second part 20. The first and second pillars 32, 33 are connected to the resilient plate 31 and respectively located in the first and second enlarged holes 232, 233. The resilient plate 31 is a wave-shaped plate and has a recessed area 311 defined in the mediate portion of one side thereof. The rod 231 in the reception hole 23 is engaged with the recessed area 311. Two protrusions 312 are formed on two ends of the other side of the resilient plate 31. The two protrusions 312 are respectively engaged with the first and second enlarged holes 232, 233. The push member 34 has a block 341 extending from one side thereof and the block 341 extends through the slot 13 of the first part 10 and contacts the first pillar 32 or the second pillar 33. In detail, the block 341 of the push member 34 extends through the slot 13 of the first part 10 and a pin 342 extends through the block 341 so that the block 341 is not disengaged from the slot 13. The push member 34 has an anti-slip surface.

A first arm 40 has a first positioning hole 41 and a first passage 42. The first pillar 32 is inserted in the first positioning hole 41. Two first curved flanges 43 respectively extend from two sides of the first arm 40 and are received in the first and second through holes 12, 22 when the first arm 40 is connected to the first and second parts 10, 20. A second arm 50 has a second positioning hole 51 and a second passage 52. The second pillar 33 is inserted in the second positioning hole 51. Two second curved flanges 53 respectively extend from two sides of the second arm 50 and are received in the first and second through holes 12, 22 when the second arm 50 is connected to the first and second parts 10, 20. An axle 60 extends through the first and second through holes 12, 22 of the first and second parts 10, 20.

Two operation units 70 are respectively connected to the first and second arms 40, 50, and each operation unit 70 has a knob 71, a movable member 72 having a path 721, and an operation member 73 having a tip 731 on each of two ends thereof. The two movable members 72 respectively extend through the first and second passages 42, 52. The two knobs 71 are respectively connected to the two movable rods 72. The two operation members 73 respectively extend through the paths 721 of the movable members 72.

A ratchet unit 90 comprises a rack 91, a resilient member 92, a release bar 93 having a head 931, and a bolt 94. The rack 91 is fixed to the first part 10 and has a toothed face 911. The bolt 94 extends through the head 931 of the release bar 93 and the resilient member 92 of the ratchet unit 90 and is connected to the second part 20. The two ends of the resilient member 92 of the ratchet unit 90 are hooked to the second part 20 and the head 931 of the release bar 93. Multiple ratchet teeth 932 are formed on an outside of the head 931 and engaged with the toothed face 911 of the rack 91. In this embodiment, the resilient member 92 of the ratchet unit 90 is a torsion spring.

The operation units 70 each have a movable members and an operation ember 73, the user simply loosens the knob 71 to replace the operation member 73 so as to match the distance between the two holes "A1" of the C-clip "A". When the tip 731 of the operation member 73 is damaged, the operation member 73 can be replaced with a new one which is secured by tightening the knob 71.

Figure 4:
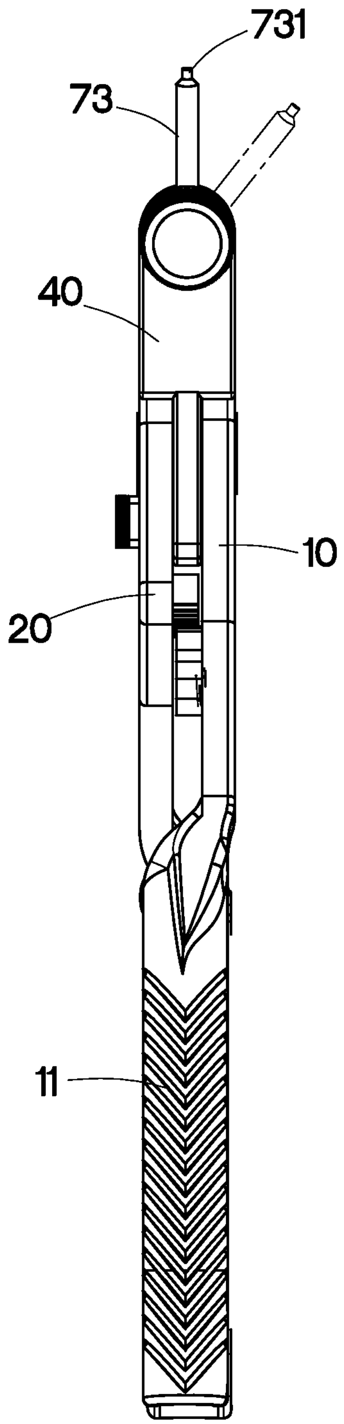
FIG. 4 is a side view of the C-clip tool of the present invention.

The user also is able to loosen the knob 71 slightly and moves the movable member 72 directly to a desired position, and the knob 71 is tightened again to adjust the operational angle of the operation members 73 as shown in FIG. 4 to easily operate the C-clip "A".

Figure 5:
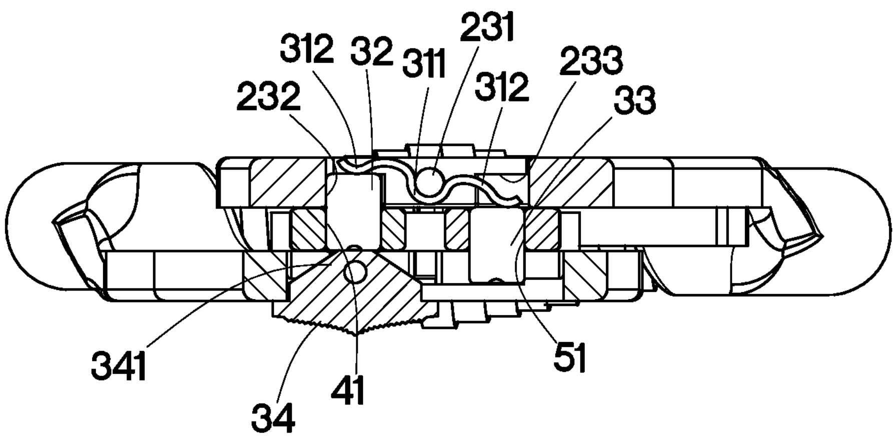
FIG. 5 is an end cross sectional view of the C-clip tool of the present invention.
Figure 6:
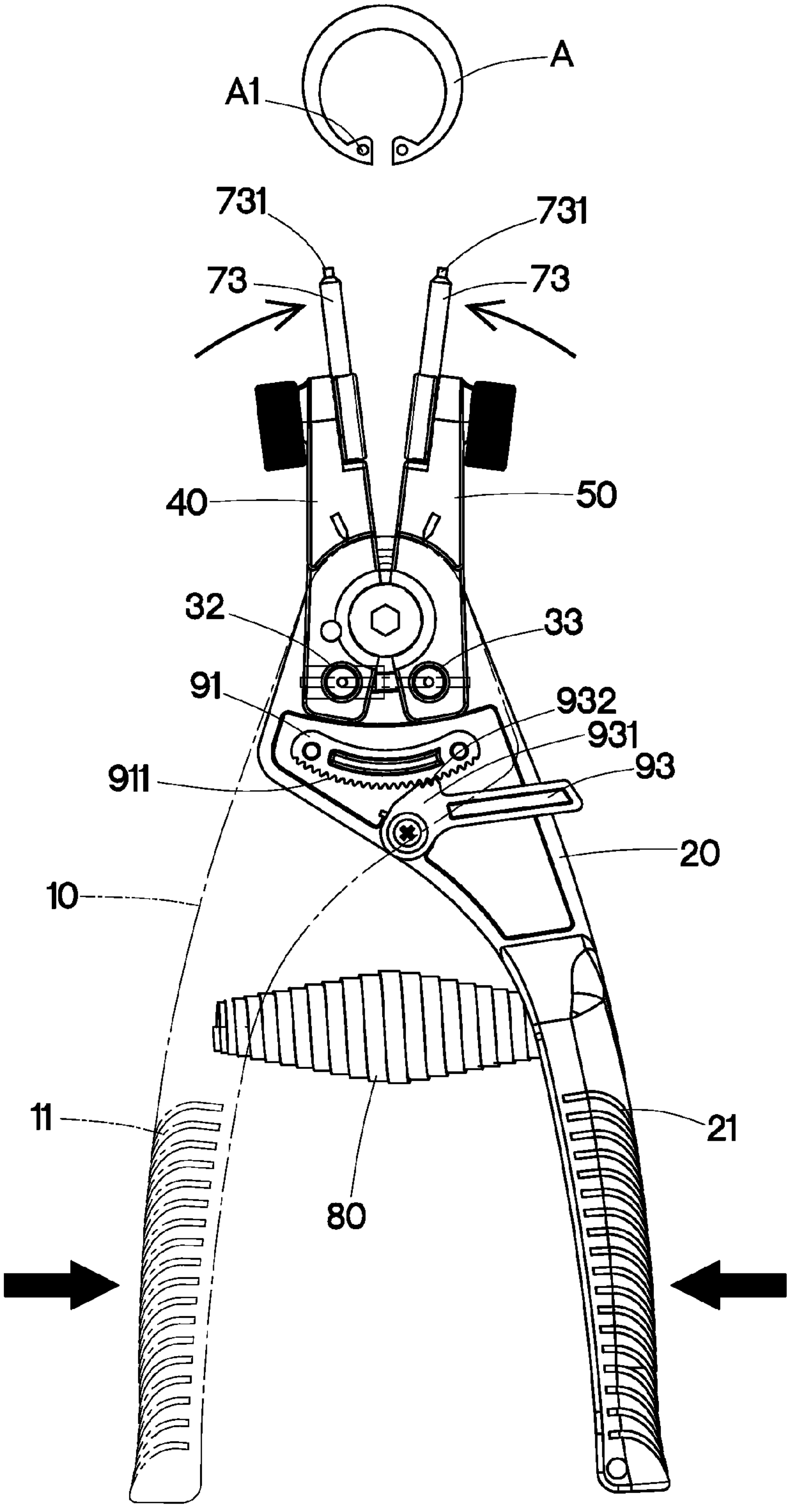
FIG. 6 shows that the C-clip tool of the present invention is used to narrow a C-clip.

When the user wants to narrow the C-clip "A", the user pushes the push member 34 toward the left to allow the block 341 of the push member 34 to contact the first pillar 32. The first pillar 32 then pushes the protrusion 312 of the resilient plate 31 and is engaged with the first enlarged hole 232 such that the resilient plate 31 is pivoted about the rod 231. The other protrusion 312 of the resilient plate 31 pushes the second pillar 33 to remove from the second enlarged hole 233 as shown in FIG. 5. Therefore, the user holds the first and second arms 11, 21 to compress the resilient member 80 so that the first and second arms 40, 50 are pivoted about the first and second pillars 32, 33 respectively, the first and second arms 40, 50 are pivoted toward each other as shown in FIG. 6. The two tips 731 on the two operation members 73 of the first and second arms 40, 50 extend through the holes "A1" of the C-clip "A" and two ends of the C-clip "A" are narrowed. Therefore, the C-clip "A" can be easily engaged with a hole (not shown). The ratchet teeth 932 of the release bar 93 are engaged with the toothed face 911 of the rack 91 to perform the ratcheting feature. The user does not need to continuously apply force to the first and second handles 11, 21. After the C-clip "A" is engaged with the hole, the user pivots the release bar 93 to disengage ratchet teeth 932 of the release bar 93 from the toothed face 911 of the rack 91. The resilient member 80 then pushes the first and second handles 11, 21 to their initial positions.

Figure 7:
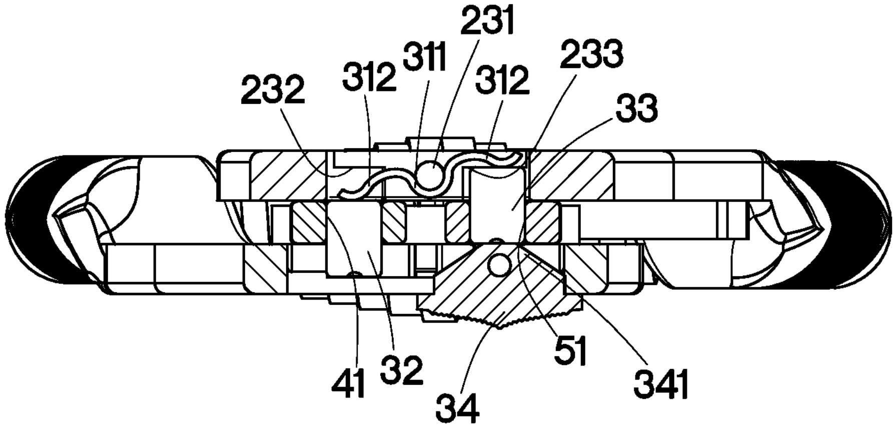
FIG. 7 is another end cross sectional view of the C-clip tool of the present invention.
Figure 8:
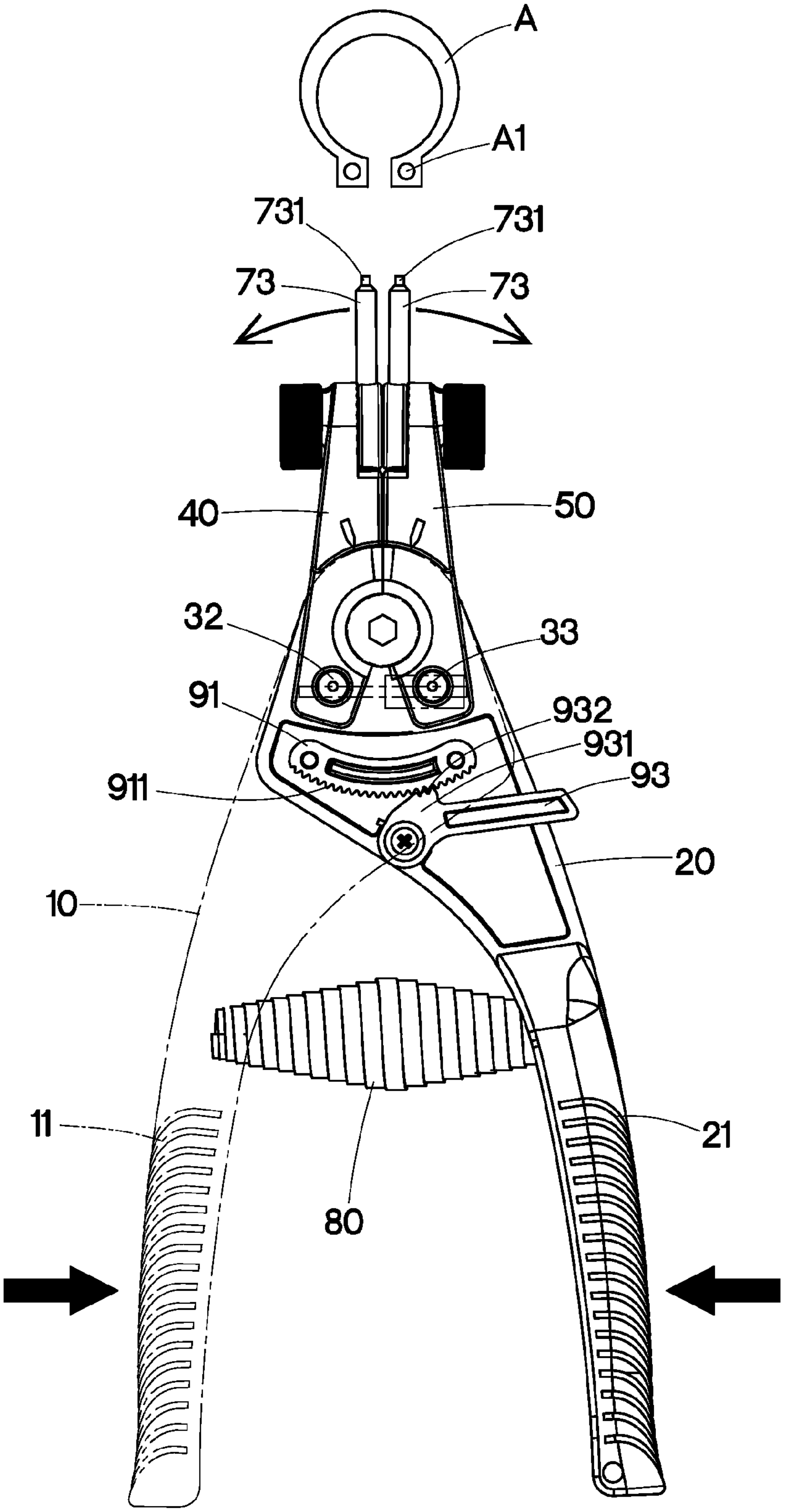
FIG. 8 shows that the C-clip tool of the present invention is used to expand a C-clip.

When the user wants to expand the C-clip "A", the user pushes the push member 34 toward the right to allow the block 341 of the push member 34 to contact the second pillar 33. The second pillar 33 then pushes the protrusion 312 of the resilient plate 31 and is engaged with the second enlarged hole 233 such that the resilient plate 31 is pivoted about the rod 231. The other protrusion 312 of the resilient plate 31 pushes the first pillar 32 to remove from the first enlarged hole 232 as shown in FIG. 7. Therefore, the user holds the first and second arms 11, 21 to compress the resilient member 80 so that the first and second arms 40, 50 are pivoted about the first and second pillars 32, 33 respectively, the first and second arms 40, 50 are pivoted away from each other as shown in FIG. 8. The two tips 731 on the two operation members 73 of the first and second arms 40, 50 extend through the holes "A1" of the C-clip "A" and the two ends of the C-clip "A" are expanded wide. Therefore, the C-clip "A" can be easily engaged with a hole (not shown). The ratchet teeth 932 of the release bar 93 are engaged with the toothed face 911 of the rack 91 to perform the ratcheting feature. The user does not need to continuously apply force to the first and second handles 11, 21. After the C-clip "A" is engaged with the hole, the user pivots the release bar 93 to disengage ratchet teeth 932 of the release bar 93 from the toothed face 911 of the rack 91. The resilient member 80 then pushes the first and second handles 11, 21 to their initial positions.

The C-clip tool provides two different functions of expanding the C-clip and narrowing the C-clip.

The C-clip tool is able to replace required the operation members easily according practical needs.

The C-clip tool is able to adjust the angle of the operation members.

While we have shown and described the embodiment in accordance with the present invention, it should be clear to those skilled in the art that further embodiments may be made without departing from the scope of the present invention.

What is claimed is:

1. A C-clip tool comprising:

a first part having a first handle on a first end thereof, a first through hole and a slot defined through a second end of the first part;

a second part having a second handle on a first end thereof, a second through hole and a reception hole defined through a second end of the second part, the second hole located corresponding to the first through hole, the reception hole located corresponding to the slot, a rod located in a mediate portion of the reception hole, a first enlarged hole and a second enlarged hole located on two ends of the reception hole and communicating with the reception hole;

a switch unit comprising a resilient plate, a first pillar, a second pillar and a push member, the resilient plate being accommodated in the reception hole of the second part, the first and second pillars connected to the resilient plate and respectively located in the first and second enlarged holes, the push member having a block extending from a side thereof and the block extending through the slot of the first part and contacting the first pillar or the second pillar;

a first arm having a first positioning hole and a first passage, the first pillar inserted in the first positioning hole, two first curved flanges, one each extending from one of the two sides of the first arm and received in the first and second through holes when the first arm is connected to the first and second parts;

a second arm having a second positioning hole and a second passage, the second pillar inserted in the second positioning hole, two second curved flanges respectively extending from two sides of the second arm and received in the first and second through holes when the second arm is connected to the first and second parts;

an axle extending through the first and second through holes of the first and second parts, and the first and second curved flanges, and two operation units respectively connected to the first and second arms, each operation unit having a knob, a movable member having a path, and an operation member having a tip on each of two ends thereof, the two movable members respectively extending through the first and second passages, the two knobs respectively connected to the two movable members, the two operation members respectively extending through the paths of the movable members.

2. The C-clip tool as claimed in claim 1, wherein the resilient plate is a wave-shaped plate and has a recessed area defined in a mediate portion of one side thereof, the rod in the reception hole is engaged with the recessed area, two protrusions are formed on two ends of the other side of the resilient plate, the two protrusions are respectively engaged with the first and second enlarged holes.

3. The C-clip tool as claimed in claim 1, wherein the push member has an anti-slip surface.

4. The C-clip tool as claimed in claim 1, wherein the block of the push member extends through the slot of the first part and a pin extends through the block so that the block is not disengaged from the slot.

5. The C-clip tool as claimed in claim 1, wherein the first and second handles each have a recess defined in an inside thereof, a resilient member is connected between the first and second handles, each end of the resilient member is engaged with one of the two recesses respectively.

6. The C-clip tool as claimed in claim 5, wherein the resilient member is a spring.

7. The C-clip tool as claimed in claim 1 further comprising a ratchet unit which comprises a rack, a resilient member, a release bar having a head, and a bolt, the rack fixed to the first part and having a toothed face, the bolt extending through the head of the release bar and the resilient member of the ratchet unit and being connected to the second part, one end of the resilient member of the ratchet unit being hooked to the second part, and the other end of the resilient member being hooked to the head of the release bar, multiple ratchet teeth being formed on an outside of the head and engaged with the toothed face of the rack.

8. The C-clip tool as claimed in claim 7, wherein the resilient member of the ratchet unit is a torsion spring.

* * * * *